United States Patent
Lee et al.

(10) Patent No.: US 10,375,661 B2
(45) Date of Patent: Aug. 6, 2019

(54) METHOD FOR TRANSMITTING SYNCHRONIZATION SIGNAL FOR D2D COMMUNICATION IN WIRELESS COMMUNICATION SYSTEM AND APPARATUS THEREFOR

(71) Applicant: LG ELECTRONICS INC., Seoul (KR)

(72) Inventors: Seungmin Lee, Seoul (KR); Hanbyul Seo, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 15/304,470

(22) PCT Filed: Apr. 24, 2015

(86) PCT No.: PCT/KR2015/004108
§ 371 (c)(1),
(2) Date: Oct. 14, 2016

(87) PCT Pub. No.: WO2015/163728
PCT Pub. Date: Oct. 29, 2015

(65) Prior Publication Data
US 2017/0041894 A1  Feb. 9, 2017

Related U.S. Application Data

(60) Provisional application No. 61/984,021, filed on Apr. 24, 2014.

(51) Int. Cl.
*H04L 1/16* (2006.01)
*H04L 1/18* (2006.01)
(Continued)

(52) U.S. Cl.
CPC ......... *H04W 56/0015* (2013.01); *H04J 11/00* (2013.01); *H04L 1/1812* (2013.01);
(Continued)

(58) Field of Classification Search
CPC .................. H04W 72/04; H04W 56/0015; H04L 5/0055; H04L 12/2854; H04L 1/1812

See application file for complete search history.

(56) References Cited

U.S. PATENT DOCUMENTS

2013/0315168 A1* 11/2013 Frank ................. G01S 5/10 370/329
2014/0064263 A1* 3/2014 Cheng ................ H04W 8/005 370/350

(Continued)

FOREIGN PATENT DOCUMENTS

CN   101472338   7/2009
JP   2012523183  9/2012

OTHER PUBLICATIONS

Catt, "Multiplexing between cellular link and D2D link", 3GPP TSG RAN WG1 Meeting #75, R1-135093, Nov. 2013, 3 pages.

(Continued)

*Primary Examiner* — Redentor Pasia
(74) *Attorney, Agent, or Firm* — Lee, Hong, Degerman, Kang & Waimey

(57) ABSTRACT

The present invention relates to a method and an apparatus for transmitting a device-to-device (D2D) synchronization signal of a first terminal in a wireless communication system. Specifically, the method comprises the steps of: receiving a radio resource setting for D2D communication; and transmitting a D2D synchronization signal to a second radio resource which corresponds to a specific index, other than a first radio resource, from among a plurality of radio resource setting-based D2D radio resources, wherein the (Continued)

first radio resource is defined to be used for wide area network (WAN) based communication.

8 Claims, 11 Drawing Sheets

(51) Int. Cl.
```
H04L 5/00      (2006.01)
H04L 5/14      (2006.01)
H04J 11/00     (2006.01)
H04L 12/28     (2006.01)
H04W 56/00     (2009.01)
H04W 72/04     (2009.01)
H04W 76/14     (2018.01)
```
(52) U.S. Cl.
CPC .......... *H04L 5/0055* (2013.01); *H04L 5/0073* (2013.01); *H04L 12/2854* (2013.01); *H04W 56/0025* (2013.01); *H04W 72/04* (2013.01); *H04W 76/14* (2018.02); *H04J 2011/0096* (2013.01); *H04L 1/1671* (2013.01); *H04L 1/1896* (2013.01); *H04L 5/0007* (2013.01); *H04L 5/1469* (2013.01)

(56) References Cited

U.S. PATENT DOCUMENTS

| | | | | |
|---|---|---|---|---|
| 2014/0211781 A1* | 7/2014 | Kim | ............... | H04W 56/002 370/350 |
| 2015/0049732 A1* | 2/2015 | Xue | ............... | H04L 1/1854 370/330 |
| 2015/0139176 A1* | 5/2015 | Morita | ............... | H04L 5/0055 370/330 |
| 2015/0304973 A1* | 10/2015 | Ye | ............... | H04W 56/0015 370/350 |
| 2016/0219541 A1* | 7/2016 | Chatterjee | ............... | H04W 76/18 |
| 2016/0242065 A1* | 8/2016 | Fukuta | ............... | H04W 72/04 |
| 2017/0142741 A1* | 5/2017 | Kaur | ............... | H04W 76/18 |

OTHER PUBLICATIONS

Panasonic, "Rough synchronization procedure in D2D", 3GPP TSG RAN WG1 Meeting #76, R1-140505, Feb. 2014, 3 pages.
Huawei, "Design considerations for D2DSS", 3GPP TSG RAN WG1 Meeting #76, R1-140207, Feb. 2014, 8 pages.
PCT International Application No. PCT/KR2015/004108, Written Opinion of the International Searching Authority dated Aug. 7, 2015, 20 pages.
LGE Electronics, "Multiplexing of Uu and D2D communication", R1-140335, 3GPP TSG RAN WG1 Meeting #76, Feb. 1, 2014, 7 pages.
LG Electronics, "On the Design of D2DSS and PD2DSCH", R1-140329, 3GPP TSG RAN WG1 Meeting #76, Feb. 1, 2014, 6 pages.
Intel Corporation, "Discussion on D2D Transmission Timing", R1-140136, 3GPP TSG RAN WG1 Meeting #76, Feb. 1, 2014, 6 pages.
LG Electronics, "Discussion on D2D Synchronization Procedure", R1-140330, 3GPP TSG RAN WG1 Meeting #76, Feb. 1, 2014, 7 pages.
Ericsson, "Frame Structure for D2D-Enabled LTE Carriers", R1-140775, 3GPP TSG RAN WG1 Meeting #76, Jan. 31, 2014, 3 pages.
European Patent Office Application Serial No. 15782436.8, Search Report dated Nov. 29, 2017, 10 pages.
Panasonic, "Physical channel design in D2D communication", 3GPP TSG RAN WG1 Meeting #76, R1-140506, Feb. 2014, 4 pages.
LG Electronics, "Discussion on design of D2DSS and PD2DSCH", 3GPP TSG RAN WG1 Meeting #76bis, R1-141357, Apr. 2014, 4 pages.
The State Intellectual Property Office of the People's Republic of China Application Serial No. 201580021363.6, Office Action dated Jan. 29, 2018, 18 pages.
LG Electronics, "Issues on multiplexing of WAN and D2D", 3GPP TSG RAN WG1 Meeting #76bis, R1-141354, Apr. 2014, 10 pages.

* cited by examiner

FIG. 2
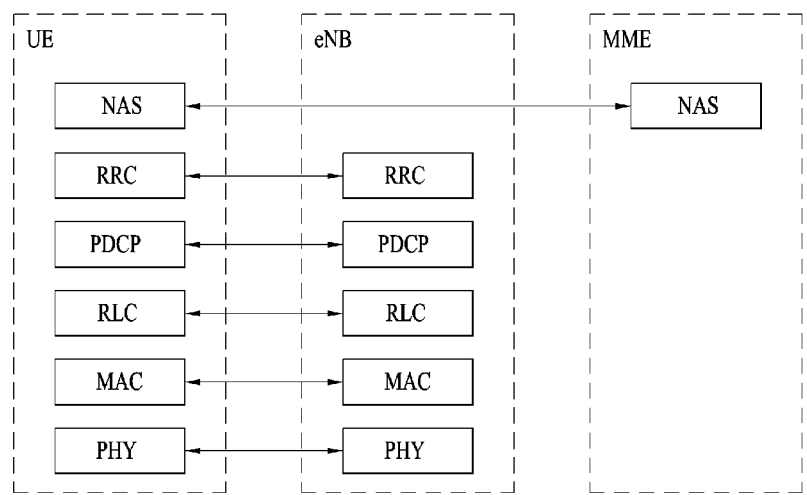
(a) Control-plane protocol stack
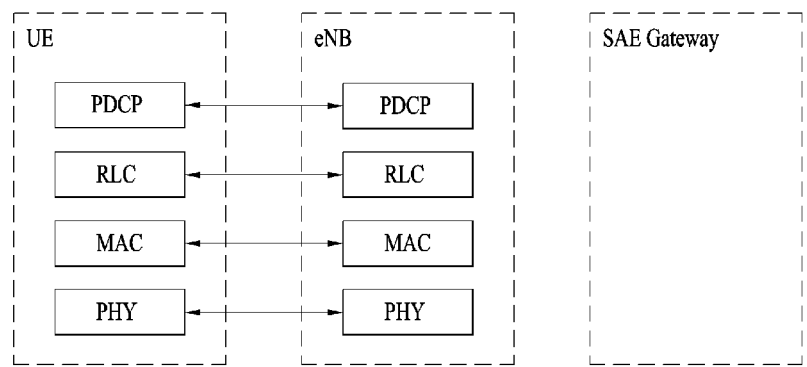
(b) User-plane protocol stack FIG. 11
(a) 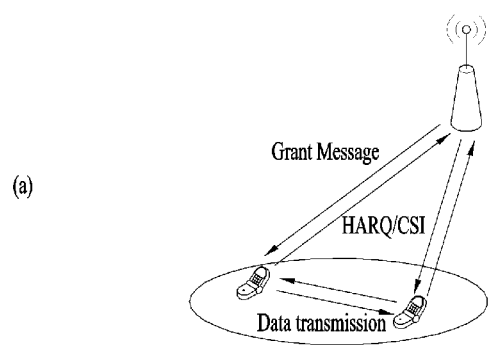
(b) 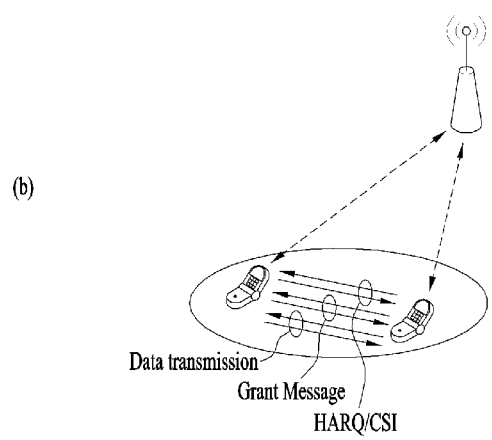

METHOD FOR TRANSMITTING SYNCHRONIZATION SIGNAL FOR D2D COMMUNICATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/004108, filed on Apr. 24, 2015, which claims the benefit of U.S. Provisional Application No. 61/984,021, filed on Apr. 24, 2014, the contents of which are all hereby incorporated by reference in their entirety.

TECHNICAL FIELD

The present invention relates to a wireless communication system and, more specifically, to a method for transmitting a synchronization signal for device-to-device (D2D) communication in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

In order to assist an eNB and efficiently managing a wireless communication system, a UE periodically and/or aperiodically reports state information about a current channel to the eNB. The reported channel state information may include results calculated in consideration of various situations, and accordingly a more efficient reporting method is needed.

DISCLOSURE

Technical Problem

An object of the present invention devised to solve the problem lies in a method of transmitting a synchronization signal for device-to-device (D2D) communication in a wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method of transmitting a device-to-device (D2D) synchronization signal of a first terminal in a wireless communication system includes: receiving a radio resource configuration for D2D communication; and transmitting the D2D synchronization signal through a second radio resource corresponding to a specific index other than a first radio resource from among a plurality of D2D radio resources based on the radio resource configuration, wherein the first radio resource is defined to be used for wide area network (WAN) based communication.

The first radio resource may be used by a second terminal for a physical uplink control channel (PUCCH) or a physical uplink shared channel (PUSCH) related to WAN radio resources.

The specific index may be defined such that a plurality of radio resource indices for transmission of D2D based uplink control information (UCI) is shifted.

The specific index may be an uplink index based on a downlink HARQ reference configuration defined for transmission of D2D based acknowledgement/negative acknowledgement (ACK/NACK).

The specific index may be obtained by applying a predetermined offset to an index based on an uplink-downlink configuration for WAN based communication.

A sequence of the D2D synchronization signal may be determined depending on the specific index.

A repetition pattern of the D2D synchronization signal may be determined according to the index of the second radio resource.

The specific index may be predefined, and the D2D synchronization signal may indicate a position of a window having a predetermined period in which the D2D synchronization signal is transmitted, in a radio resource corresponding to the specific index.

The specific index may be used to generate a sequence of a reference signal for decoding of the D2D synchronization signal.

The D2D synchronization signal may include information indicating the number of relays for D2D communication. The information indicating the number of relays may be defined as a hop count, and the D2D synchronization signal may include the hop count and a system frame number.

The D2D synchronization signal may be a sidelink synchronization signal.

In another aspect of the present invention, a first terminal configured to transmit a D2D synchronization signal in a wireless communication system includes: a radio frequency (RF) unit; and a processor, wherein the processor is configured to receive a radio resource configuration for D2D communication and to transmit the D2D synchronization signal through a second radio resource corresponding to a specific index other than a first radio resource from among a plurality of D2D radio resources based on the radio resource configuration, wherein the first radio resource is defined to be used for WAN based communication.

Advantageous Effects

According to embodiments of the present invention, transmission and reception of signals for D2D communication in a wireless communication system can be efficiently performed.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 2 illustrates structures of a control plane and a user plane of a radio interface protocol between a UE and E-UTRAN based on the 3GPP radio access network standard;

FIG. 11 is a reference diagram illustrating D2D (UE-to-UE) communication;

BEST MODE

Figure 1:
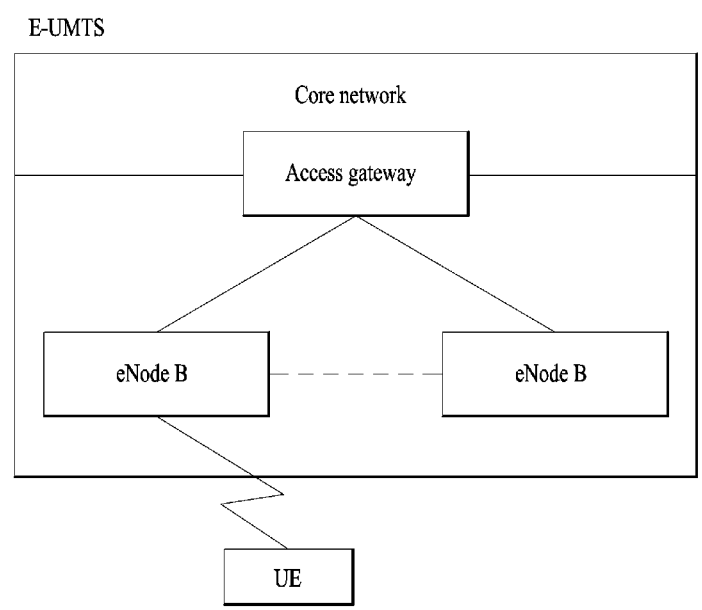
FIG. 1 illustrates a network structure of an E-UMTS as an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
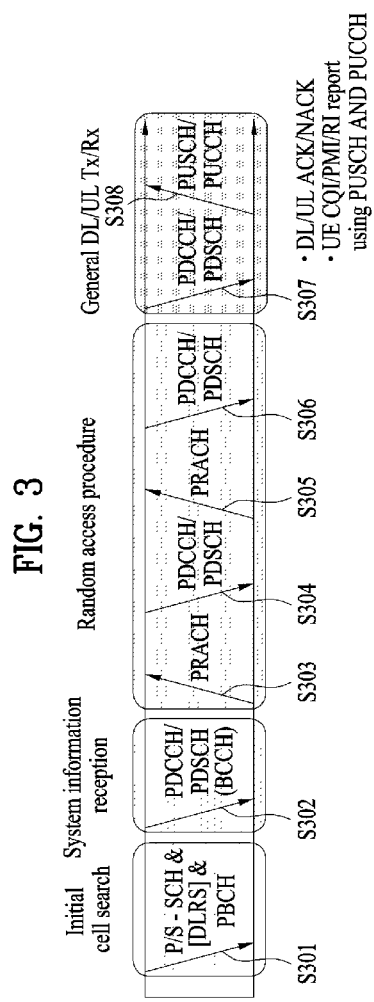
FIG. 3 illustrates physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. Control information transmitted from the user equipment to the base station will be commonly referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be simply referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may aperiodically transmit the UCI through the PUSCH in accordance with request/command of the network.

Figure 4:
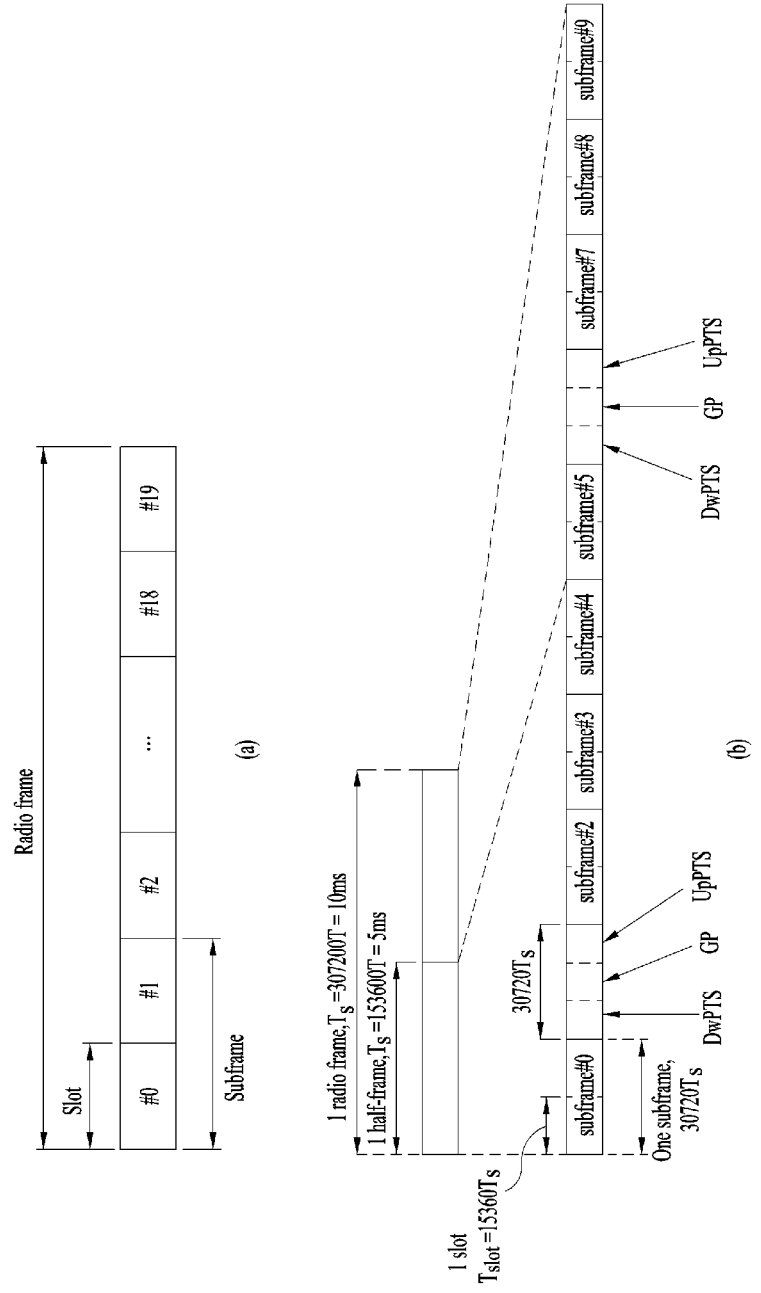
FIG. 4 illustrates a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times 2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
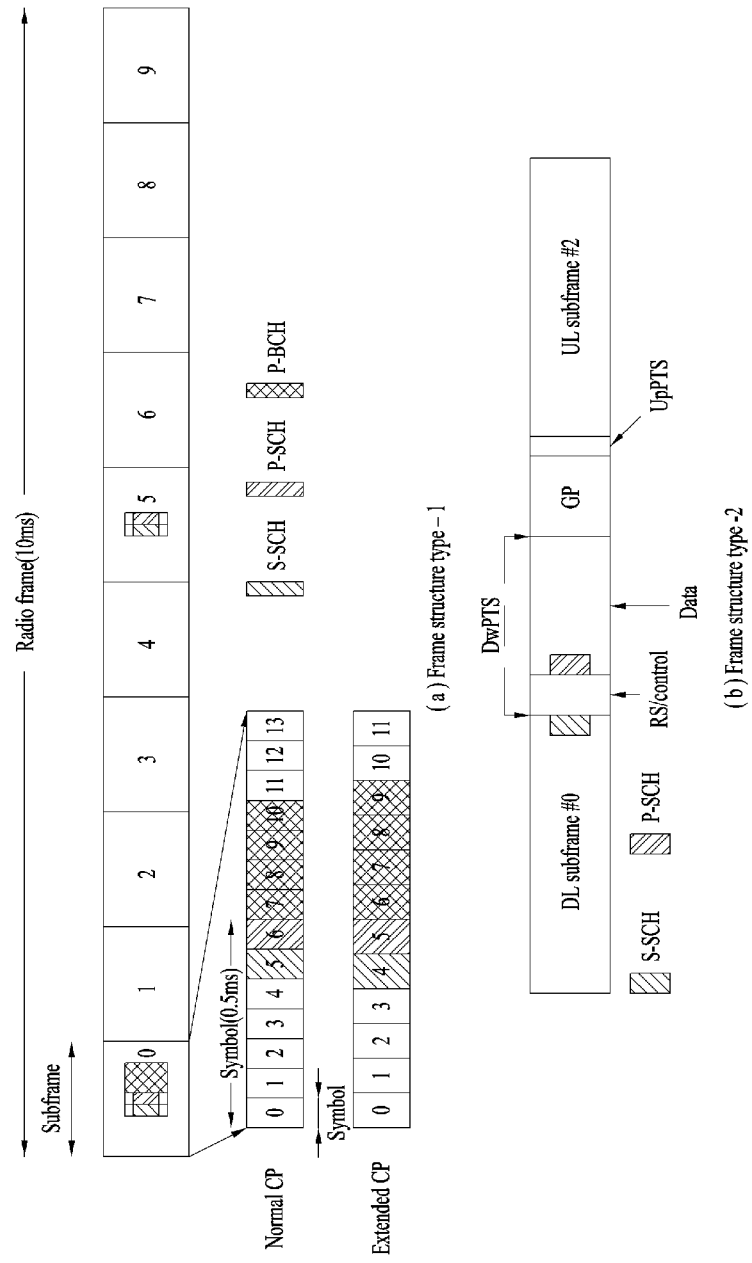
FIG. 5 illustrates a P-BCH (primary broadcast channel) and an SCH (synchronization channel) in an LTE system.

FIG. 5 illustrates a P-BCH (primary broadcast channel) and an SCH (synchronization channel) in LTE. The SCH includes a P-SCH and an S-SCH. A PSS (primary synchronization signal) is transmitted on the P-SCH and an SSS (secondary synchronization signal) is transmitted on the S-SCH.

Referring to FIG. 5, in frame structure type 1 (i.e., FDD), the P-SCH is disposed at the last OFDM symbols of slot #0 (i.e., the first slot of subframe #0) and slot #10 (i.e., the first slot of subframe #5) in each radio frame. The S-SCH is disposed at OFDM symbols immediately before the last OFDM symbols of slot #0 and slot #10 in each radio frame. The S-SCH and the P-SCH are positioned at neighboring OFDM symbols. In frame structure type 2 (i.e., TDD), the P-SCH is transmitted through the third OFDM symbols of

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | subframes #1/#6 and the S-SCH is positioned at the last OFDM symbols of slot #1 (i.e., the second slot of subframe #0) and slot #11 (i.e., the second slot of subframe #5). The P-BCH is transmitted every four radio frames using the first to fourth OFDM symbols of the second slot of subframe #0 irrespective of frame structure type.

The P-SCH is transmitted in the corresponding OFDM symbols using 72 subcarriers (10 subcarriers are reserved and 62 subcarriers carry a PSS) on the basis of a DC subcarrier. The S-SCH is transmitted in the corresponding OFDM symbols using 72 subcarriers (10 subcarriers are reserved and 62 subcarriers carry an SSS) on the basis of the DC subcarrier. The P-BCH is mapped to 72 subcarriers on the basis of 4 OFDM symbols and the DC subcarrier in one subframe.

Figure 6:
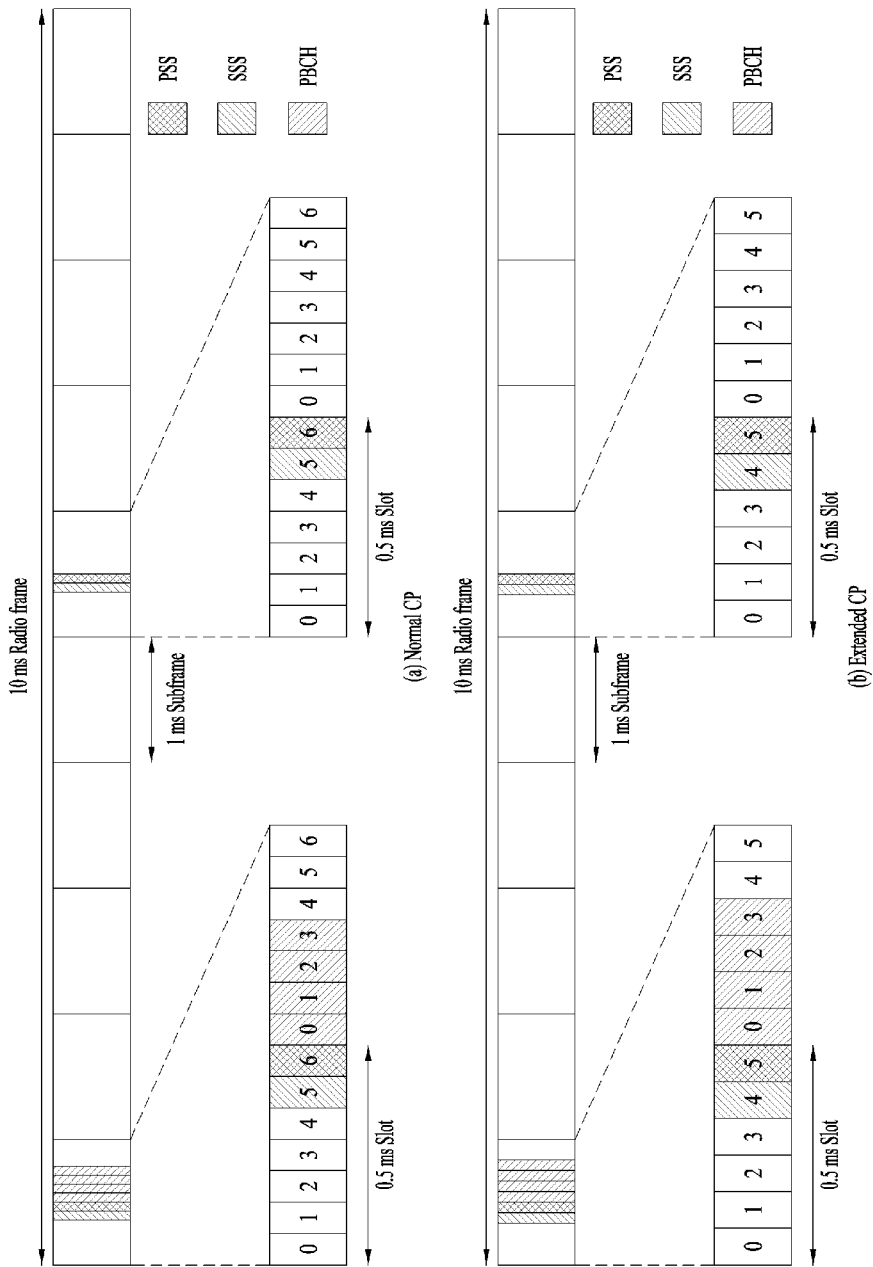
FIG. 6 illustrates a radio frame structure for transmission of a synchronization signal (SS)

FIG. 6 illustrates a radio frame structure for transmission of a synchronization signal (SS). Particularly, FIG. 6 illustrates a radio frame structure for transmission of an SS and a PBCH in FDD. FIG. 6($a$) shows transmission positions of the SS and PBCH in a radio frame configured by a normal cyclic prefix (CP) and FIG. 6($b$) shows transmission positions of the SS and PBCH in a radio frame configured by an extended CP.

When a UE is powered on or newly enters a cell, the UE performs an initial cell search procedure for acquiring time and frequency synchronization with the cell and detecting the physical cell ID of the cell. To this end, the UE may synchronizes with an eNB by receiving synchronization signals, for example, a primary synchronization signal (PSS) and a secondary synchronization signal (SSS), from the eNB, and acquire information such as cell ID, etc.

The SS will be described in detail with reference to FIG. 6. The SS is divided into the PSS and SSS. The PSS is used to acquire time domain synchronization and/or frequency domain synchronization such as OFDM symbol synchronization and slot synchronization and the SSS is used to acquire frame synchronization, a cell group ID and/or CP configuration (i.e., information on use of a normal CP or extended CP) of a cell. Referring to FIG. 6, the PSS and SSS are respectively transmitted through two OFDM symbols in every radio frame. Specifically, the SS is transmitted in the first slot of subframe #0 and the first slot of subframe #5 in consideration of the global system for mobile communication (GSM) frame length of 4.6 ms for facilitation of inter radio access technology (inter-RAT) measurement. Particularly, the PSS is transmitted in the last OFDM symbol of the first slot of subframe #0 and the last OFDM symbol of the first slot of subframe #5, and the SSS is transmitted in the OFDM symbol before the last OFDM symbol of the first slot of subframe #0 and the OFDM symbol before the last OFDM symbol of the first slot of subframe #5. The boundary of the corresponding radio frame can be detected through the SSS. The PSS is transmitted in the last OFDM symbol of the corresponding slot and the SSS is transmitted in the OFDM symbol immediately before the PSS. Transport diversity of the SS uses a single antenna port only and is not additionally defined in the standards. That is, single antenna port transmission or UE transparent transmission (e.g., PVS (Precoding Vector Switching), TSTD (Time Switched Diversity) and CDD (cyclic delay diversity)) can be used for transport diversity of the SS.

The SS can represent 504 unique physical layer cell IDs through combinations of three PSSs and 168 SSs. In other words, physical layer cell IDs are grouped into 168 physical-layer cell ID groups such that each physical layer ID belongs to only one physical-layer cell ID group and each group includes three unique IDs. Accordingly, a physical layer cell ID, $N^{cell}_{ID}=3N^{(1)}_{ID}+N^{(2)}_{ID}$, is uniquely defined by a number $N^{(1)}_{ID}$ in the range of 0 to 167 that indicate physical-layer cell ID groups and a number $N^{(2)}_{ID}$ in the range of 0 to 2 that indicate physical layer IDs in the corresponding physical-layer cell ID group. The UE can be aware of one of three unique physical layer IDs by detecting the PSS and can recognize one of 168 physical-layer cell IDs related to the physical layer ID by detecting the SSS. A Zadoff-Chu (ZC) sequence having a length of 63 is defined in the frequency domain and used as a PSS. For example, the ZC sequence can be defined by the following equation.

$$d_u(n) = e^{-j\frac{\pi un(n+1)}{N_{ZC}}} \quad \text{[Equation 1]}$$

Here, $N_{ZC}=63$ and a sequence element corresponding to a DC subcarrier, n=31, is punctured.

The PSS is mapped to 6 RBs (=72 subcarriers) close to the center frequency. 9 reserved subcarriers of the 72 subcarriers carry 0 all the time and serve as a factor for facilitating filter design for synchronization. To define a total of 3 PSSs, u=24, u=29 and u=34 are used in Equation 1. Since u=24 and u=34 have a conjugate symmetry relationship therebetween, two correlations can be simultaneously performed. Here, conjugate symmetry refers to a relationship between the following equations.

$$d_u(n)=(-1)^n(d_{N_{ZC}-u}(n))^*, \text{ when } N_{ZC} \text{ is even number}$$

$$d_u(n)=(d_{N_{ZC}-u}(n))^*, \text{ when } N_{ZC} \text{ is odd number} \quad \text{[Equation 2]}$$

When conjugate symmetry properties are used, a one-shot correlator for u=29 and u=34 can be realized and overall operation load can be reduced approximately 33.3% compared to a case in which conjugate symmetry is not used.

More specifically, a sequence d(n) used for the PSS is generated from the frequency domain ZC sequence according to the following equation.

$$d_u(n) = \begin{cases} e^{-j\frac{\pi un(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 3]}$$

Here, a ZC root sequence index u is given by the following table.

TABLE 3

| $N^{(2)}_{ID}$ | Root index u |
|---|---|
| 0 | 25 |
| 1 | 29 |
| 2 | 34 |

Referring to FIG. 6, since the PSS is transmitted every 5 ms, the UE can recognize that the corresponding subframe is one of subframes #0 and #5 by detecting the PSS but cannot be aware of which one of subframes #0 and #5 is exactly the corresponding subframe. Accordingly, the UE cannot recognize a radio frame boundary using the PSS only. That is, the UE cannot acquire frame synchronization using the PSS only. The UE detects a radio frame boundary by detecting the SSS that is transmitted twice as different sequences in one radio frame.

Figure 7:
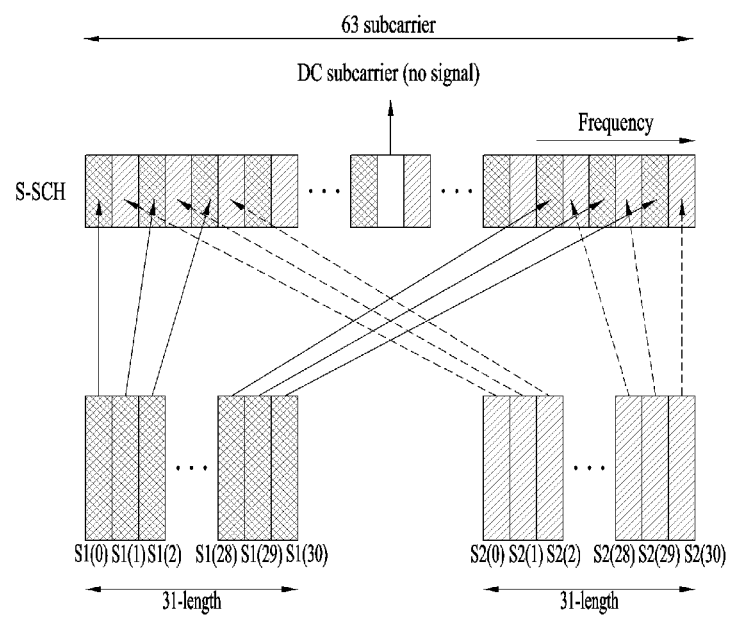
FIG. 7 is a reference diagram illustrating a method of generating a secondary synchronization signal (SSS)

FIG. 7 illustrates a method of generating the SSS. Specifically, FIG. 7 shows a relationship of mapping two sequences in a logical domain to a physical domain.

A sequence used for the SSS is an interleaved concatenation of two m-sequences having a length of 31 and the concatenated sequences are scrambled by a scrambling sequence given by the PSS. Here, an m-sequence is a kind of a pseudo noise (PN) sequence.

Referring to FIG. 7, when two m-sequences used for SSS code generation are S1 and S2, two different PSS based sequences are scrambled into the SSS. Here, S1 and S2 are scrambled by different sequences. A PSS based scrambling code can be obtained by cyclically shifting an m-sequence generated from a polynomial, $x^5+x^3+1$. 6 sequences are generated through cyclic shift of the m-sequence according to PSS index. Then, S2 is scrambled by an S1 based scrambling code. The S1 based scrambling code can be obtained by cyclically shifting an m-sequence generated form a polynomial, $x^5+x^4+x^2+x^1+1$. 8 sequences are generated through cyclic shift of the m-sequence according to S1 index. While the SSS code is swapped every 5 ms, the PSS based scrambling code is not swapped. For example, when it is assumed that the SSS of subframe #0 carries a cell group ID through a combination of (S1, S2), the SSS of subframe #5 carries a sequence swapped to (S2, S1). Accordingly, the boundary of a 10 ms radio frame can be detected. The SSS code used in this case is generated from $x^5+x^2+1$, and a total of 31 codes can be generated through different cyclic shifts of an m-sequence having a length of 31.

A combination of two length-31 m-sequences, which define the SSS, is different in subframe #0 and subframe #5, and 168 cell group IDs are represented by combinations of the two length-31 m-sequences. The m-sequence used as an SSS sequence is robust in frequency selective environments. Furthermore, the m-sequence can be transformed according to fast m-sequence transform using fast Hadamard transform, and thus operation load necessary for the UE to analyze the SSS can be reduced when the m-sequence is used as the SSS. In addition, the SSS is composed of two short codes, resulting in decrease in UE operation load.

More specifically, generation of the SSS is described. A sequence $d(0), \ldots, d(61)$ used for the SSS is an interleaved concatenation of two length-31 binary sequences. The concatenated sequences are scrambled by a scrambling sequence given by the PSS.

A combination of two length-31 sequences for defining the PSS is different in subframe #0 and subframe #5 as follows.

$$d(2n) = \begin{cases} s_0^{(m_0)}(n)c_0(n) & \text{in subframe 0} \\ s_1^{(m_1)}(n)c_0(n) & \text{in subframe 5} \end{cases}$$ [Equation 4]

$$d(2n+1) = +\begin{cases} s_1^{(m_1)}(n)c_1(n)z_1^{(m_0)} & \text{in subframe 0} \\ s_0^{(m_0)}(n)c_1(n)z_1^{(m_1)}(n) & \text{in subframe 5} \end{cases}$$

Here, $0 \le n \le 30$. Indices $m_0$ and $m_1$ are derived from the physical-layer cell ID group $N^{(1)}_{ID}$ according to the following equation.

$$m_0 = m' \bmod 31$$ [Equation 5]
$$m_1 = (m_0 + \lfloor m'/31 \rfloor + 1) \bmod 31$$

-continued
$$m' = N^{(1)}_{ID} + q(q+1)/2,$$
$$q = \left\lfloor \frac{N^{(1)}_{ID} + q'(q'+1)/2}{30} \right\rfloor,$$
$$q' = \lfloor N^{(1)}_{ID}/30 \rfloor$$

The output of Equation 5 is listed in Table 4 following Equation 11.

Two sequences $S^{(m0)0}(n)$ and $S^{(m1)1}(n)$ are defined as two different cyclic shifts of an m-sequence s(n).

$$s_0^{(m0)}(n) = s((n+m_0) \bmod 31)$$

$$s_1^{(m1)}(n) = s((n+m_1) \bmod 31)$$ [Equation 6]

Here, $s(i) = 1-2 \times (i)$ ($0 \le i \le 30$) with initial conditions of $x(0)=0, x(1)=0, x(2), x(3)=0, x(4)=1$, which is defined by the following equation.

$$x(\bar{i}+5) = (x(\bar{i}+3) + x(\bar{i})) \bmod 2, \ 0 \le \bar{i} \le 25$$ [Equation 7]

Two scrambling sequences $c_0(n)$ and $c_1(n)$ depend on the PSS and are defined by the following equation according to two different cyclic shifts of an m-sequence c(n).

$$c_0(n) = c((n+N_{ID}^{(2)}) \bmod 31)$$

$$c_1(n) = c((n+N_{ID}^{(2)}+3) \bmod 31)$$ [Equation 8]

Here, $N^{(2)}_{ID} \in \{0,1,2\}$ is a physical layer ID in the physical-layer cell ID group $N^{(1)}_{ID}$ and $c(i) = 1-2 \times (i)$ ($0 \le i \le 30$) with initial conditions of $x(0)=0, x(1)=0, x(2), x(3)=0, x(4)=1$, which is defined by the following equation.

$$x(\bar{i}+5) = (x(\bar{i}+3) + x(\bar{i})) \bmod 2, \ 0 \le \bar{i} \le 25$$ [Equation 9]

Scrambling sequences $Z^{(m0)1}(n)$ and $Z^{(m1)1}(n)$ are defined by cyclic shifts of an m-sequence z(n) according to the following equation.

$$z_1^{(m0)}(n) = z((n+(m_0 \bmod 8)) \bmod 31)$$

$$z_1^{(m1)}(n) = z((n+(m_1 \bmod 8)) \bmod 31)$$ [Equation 10]

Here, $m_0$ and $m_1$ are obtained from Table 4 following Equation 11, and $z(i) = 1-2 \times (i)$ ($0 \le i \le 30$) with initial conditions of $x(0)=0, x(1)=0, x(2), x(3)=0, x(4)=1$, which is defined by the following equation.

$$x(\bar{i}+5) = (x(\bar{i}+4) + x(\bar{i}+2) + x(\bar{i}+1) + x(\bar{i})) \bmod 2, \ 0 \le \bar{i} \le 25$$ [Equation 11]

TABLE 4

| $N^{(1)}_{ID}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |

TABLE 4-continued

| $N^{(1)}_{ID}$ | $m_0$ | $m_1$ |
|---|---|---|
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

Upon determination of time and frequency parameters necessary to perform DL signal demodulation and UL signal transmission at correct time by performing a cell search procedure using the SSS, the UE can communicate with the eNB only when system information necessary for system configuration of the UE is acquired from the eNB.

The system information is composed of a master information block (MIB) and system information blocks (SIBs). Each system information block includes a collection of functionally associated parameters and is classified as an MIB, SIB1, SIB2 or SIB3 to SIB8 depending on parameters included therein. The MIB includes parameters that are necessary for the UE to initially access the network of the eNB and most frequently transmitted. The SIB1 includes not only information about time domain scheduling of other SIBs but also parameters necessary to determine whether a specific cell is a cell suitable for cell selection.

The UE can receive the MIB through a broadcast channel (e.g., a PBCH). The MIB includes a downlink bandwidth (DL BW), a PHICH configuration and a system frame number (SFN). Accordingly, the UE can be explicitly aware of information about the DL BW, SFN and PHICH configuration by receiving the PBCH. Information that the UE can be implicitly aware of by receiving the PBCH includes the number of transmit antennas of the eNB. The information about the number of transmit antennas of the eNB is implicitly signaled by masking (e.g., XOR-operating) a 16-bit cyclic redundancy check (CRC) used for error detection of the PBCH with a sequence corresponding to the number of transmit antennas.

The PBCH is mapped to 4 subframes for 40 ms. The time of 40 ms is blind-detected and is not explicitly signaled. In the time domain, the PBCH is transmitted in OFDM symbols #0 to #3 of slot #1 (the second slot of subframe #0) of subframe #0 in a radio frame.

In the frequency domain, the PSS/SSS and PBCH are transmitted only in 6 RBs, three RBs each on the left and right of the DC subcarrier, that is, a total of 72 subcarriers in corresponding OFDM symbols irrespective of the actual system bandwidth. Accordingly, the UE is configured to detect or decode the SS and PBCH irrespective of the DL bandwidth configured therefor.

Upon accessing the network of the eNB after initial cell search, the UE can acquire more specific system information by receiving a PDCCH and a PDSCH according to information included in the PDCCH. After performing the aforementioned procedure, the UE can perform PDCCH/PDSCH reception and PUSCH/PUCCH transmission as a normal uplink/downlink signal transmission procedure.

Figure 8:
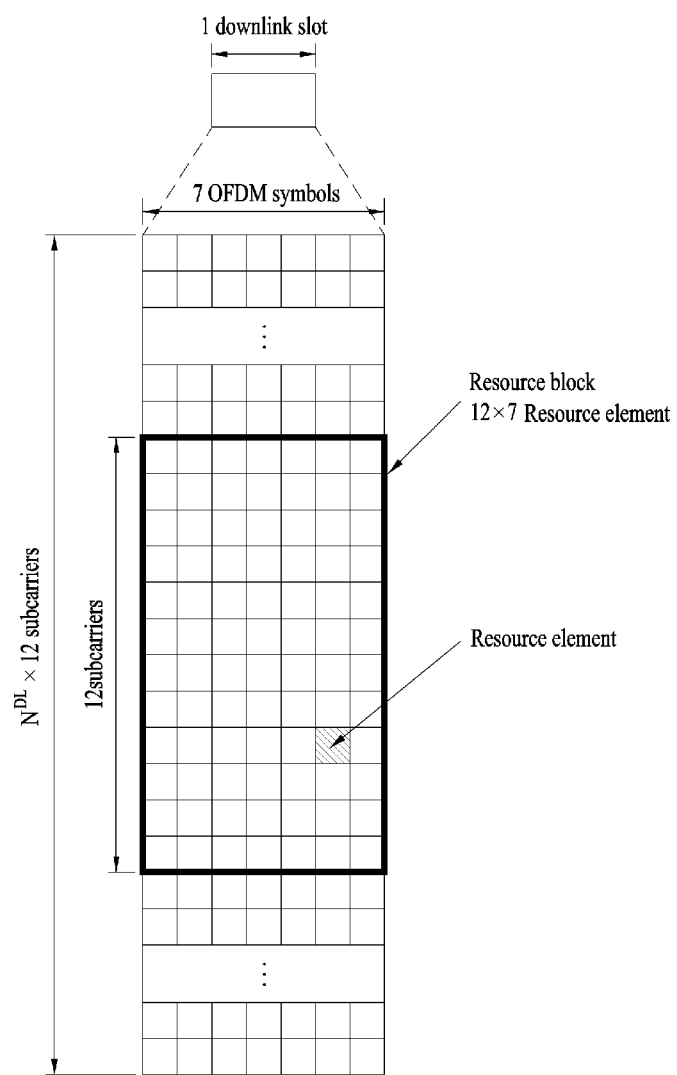
FIG. 8 illustrates a resource grid in a downlink slot.

FIG. 8 illustrates a resource grid in a downlink slot.

Referring to FIG. 8, the downlink slot includes $N_{symb}^{DL}$ OFDM symbols in the time domain and includes $N_{RB}^{DL}$ resource blocks in the frequency domain. Since each resource block includes $N_{sc}^{RB}$ subcarriers, the downlink slot includes $N_{RB}^{DL} \times N_{sc}^{RB}$ subcarriers in the frequency domain. While FIG. 8 shows that the downlink slot includes 7 OFDM symbols and a resource block includes 12 subcarriers, the present invention is not limited thereto. For example, the number of OFDM symbols included in the downlink slot can vary according to cyclic prefix (CP) length.

An element on the resource grid is called a resource element (RE) and one RE is indicated by one OFDM symbol index and one subcarrier index. One RB is composed of $N_{symb}^{DL} \times N_{sc}^{RB}$ REs. The number $N_{RB}^{DL}$ of resource blocks included in the downlink slot depends on a downlink bandwidth set in a cell.

Figure 9:
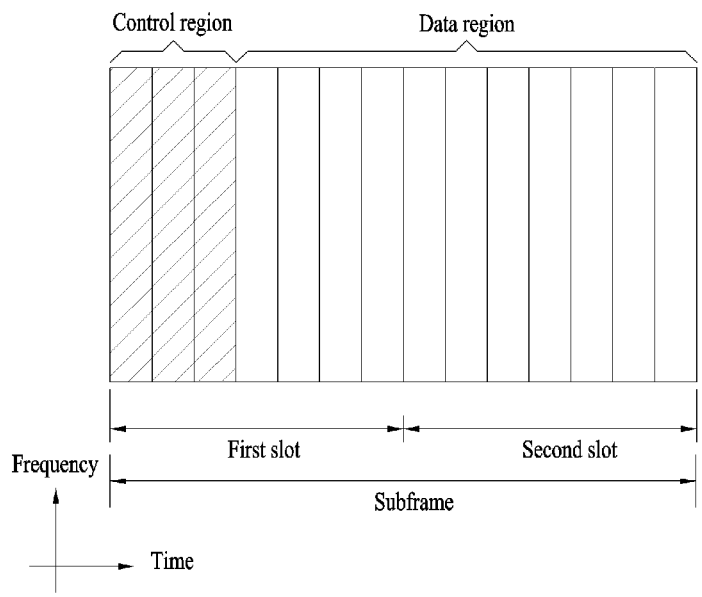
FIG. 9 illustrates a downlink radio frame structure used in LTE.

FIG. 9 illustrates a downlink subframe structure.

Referring to FIG. 9, up to three (four) OFDM symbols at the start of the first slot in a subframe correspond to a control region to which control channels are allocated and the other OFDM symbols correspond to a data region to which a physical downlink shared channel (PDSCH) is allocated. Examples of downlink control channels used in LTE include a physical control format indicator channel (PCFICH), a physical downlink control channel (PDCCH), and a physical hybrid ARQ indicator channel (PHICH). The PCFICH is transmitted in the first OFDM symbol of a subframe and carries information about the number of OFDM symbols used for transmission of control channels in the subframe. The PHICH delivers an HARQ automatic repeat request acknowledgment/negative acknowledgment (ACK/NACK) signal in response to an uplink transmission.

Control information carried on the PDCCH is called downlink control information (DCI). The DCI includes resource allocation information for a UE or a UE group and other control information. For example, the DCI includes uplink/downlink scheduling information, uplink transmit (Tx) power control commands and the like.

The PDCCH delivers information about a transport format and resource allocation for a downlink shared channel (DL-SCH), information about a transport format and resource allocation for an uplink shared channel (UL-SCH), paging information on a paging channel (PCH), system information on a DL-SCH, resource allocation information of a higher-layer control message such as a random access response transmitted on a PDSCH, a set of Tx power control commands for individual UEs of a UE group, Tx power control information, voice over Internet protocol (VoIP) activation information, etc. A plurality of PDCCHs may be transmitted in the control region. A UE may monitor a plurality of PDCCHs. A PDCCH is transmitted on an aggregate of one or more consecutive control channel elements (CCEs). A CCE is a logical allocation unit used to provide a PDCCH at a coding rate based on the state of a radio channel. A CCE corresponds to a plurality of resource element groups (REGs). The format of a PDCCH and the number of PDCCH bits are determined by the number of CCEs. An eNB determines the PDCCH format according to DCI transmitted to a UE and adds a cyclic redundancy check (CRC) to control information. The CRC is masked by an identifier (ID) (e.g., radio network temporary identifier (RNTI)) according to the owner or usage of the PDCCH. If the PDCCH is directed to a specific UE, its CRC may be masked by an identifier (e.g., cell-RNTI (C-RNTI) of the UE. If the PDCCH carries a paging message, the CRC of the PDCCH may be masked by a paging radio network temporary identifier (P-RNTI). If the PDCCH carries system information (particularly, a system information block (SIB), its CRC may be masked by a system information RNTI (SI-RNTI). If the PDCCH carries a random access response, the CRC may be masked by a random access-RNTI (RA-RNTI).

Figure 10:
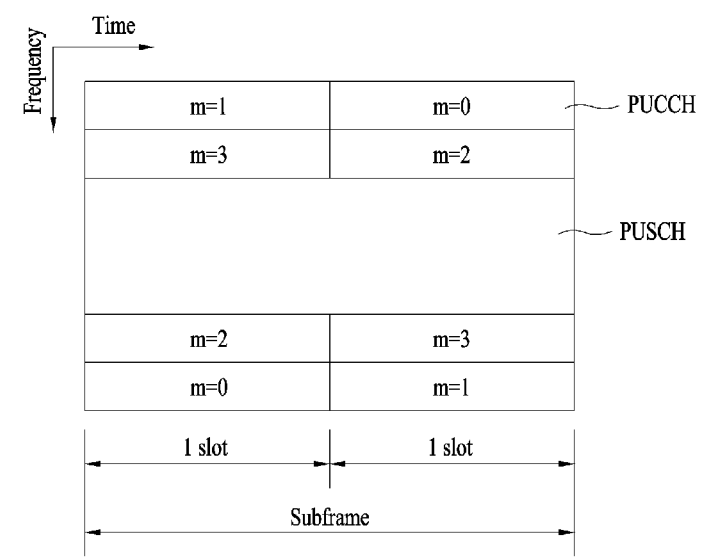
FIG. 10 illustrates an uplink subframe structure used in LTE.

FIG. 10 illustrates an uplink subframe structure.

Referring to FIG. 10, an uplink subframe includes a plurality of (e.g., 2) slots. A slot may include different numbers of SC-FDMA symbols depending on CP length. The uplink subframe is divided into a control region and a data region in the frequency domain. The data region includes a PUSCH and is used to transmit a data signal such as voice. The control region includes a PUCCH and is used to transmit uplink control information (UCI). A PUCCH includes an RB pair disposed at both ends of the data region in the frequency domain and is hopped over a slot boundary.

The PUCCH may be used to transmit the following information.

- SR (Scheduling Request): this is information used to request uplink UL-SCH resources and is transmitted using OOK (On-Off Keying).

HARQ ACK/NACK: this is a response signal to a downlink data packet on a PDSCH and indicates whether the downlink data packet has successfully received. 1-bit ACK/NACK is transmitted in response to a single downlink codeword and 2-bit ACK/NACK is transmitted in response to two downlink codewords.

CSI (Channel State Information): this is feedback information about a downlink channel. The CSI includes a CQI (Channel Quality Indicator), and MIMO (Multiple Input Multiple Output) related feedback information includes an RI (Rank Indicator), a PMI (Precoding Matrix Indicator) and a PTI (Precoding Type Indicator). 20 bits are used per subframe.

The quantity of control information (UCI) that can be transmitted in a subframe by a user equipment depends on the number of SC-FDMAs available for control information transmission. SC-FDMAs available for control information transmission refer to SC-FDMA symbols that remain after SC-FDMA symbols for reference signal transmission are excluded in a subframe. In the case of a subframe in which a sounding reference signal (SRS) is configured, the last SC-FDMA symbol of the subframe is excluded. A reference signal is used for PUCCH coherence detection.

A description will be given of D2D (UE-to-UE) communication.

D2D communication schemes can be classified into a communication scheme assisted by a network/coordination station (e.g., eNB) and others.

Referring to FIG. 11, FIG. 11(a) illustrates a scheme in which a network/coordination station intervenes in transmission and reception of a control signal (e.g., grant message), HARQ and channel state information and only transmission/reception of data is performed between UEs performing D2D communication. FIG. 11(b) shows a scheme in which a network provides minimum information (e.g., D2D connection information available in the corresponding cell) and UEs performing D2D communication establish a link and transmit/receive data.

Figure 12:
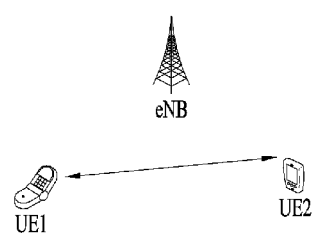
FIG. 12 is a reference diagram illustrating scenarios in which D2D communication is performed.

Based on the aforementioned description, the present invention proposes methods of efficiently defining a timing/time at which D2D communication related UEs transmit a synchronization signal (i.e., D2D synchronization signal (D2DSS) and/or a physical D2D synchronization channel (PD2DSCH)) when a UE performs direct communication (i.e., D2D communication) with another UE through a radio channel, as illustrated in FIG. 12. Here, while a UE refers to a user terminal, network equipment such as an eNB may be regarded as a UE when the network equipment transmits/receives signals according to a communication scheme between UEs.

The present invention will be described on the basis of 3GPP LTE for convenience of description. However, the range of systems to which the present invention is applied can be extended to systems other than 3GPP LTE. Methods proposed by the present invention may be configured to be restrictively applied to i) a case in which some D2D UEs participating in D2D communication are located within the coverage of a network and the remaining D2D UEs are located outside the coverage of the network (D2D discovery/communication of partial network coverage), ii) a case in which all D2D UEs participating in D2D communication are located within the coverage of the network (D2D discovery/communication within network coverage) or iii) a case in which all D2D UEs participating in D2D communication are located outside the network coverage (D2D discovery/communication outside network coverage (for public safety only)).

In an embodiment of the present invention, a D2DSS (or PD2DSCH or sidelink synchronization signal) may be configured to be transmitted only on a predefined subframe index and/or radio frame index. Here, information on the subframe index and/or radio frame index on which the D2DSS (or PD2DSCH or sidelink synchronization signal) is transmitted may be configured to be signaled by an eNB to D2D UEs through a predefined signal (e.g., a physical layer signal or a higher layer signal) or defined as previously fixed value(s).

Furthermore, in an embodiment of the present invention, indices/positions of specific radio resources (e.g., uplink resources) available for D2D communication in radio resources configured for a UE may be signaled through additional signaling (e.g., RRC), and the UE can perform D2D communication with other UEs using the available radio resources. Here, reindexing may be performed only for radio resources for D2D.

In an embodiment of the present invention, the information on the subframe index and/or radio frame index on which the D2DSS (or PD2DSCH or sidelink synchronization signal) is transmitted may be defined as one of i) information based on wide area network (WAN) communication related subframe indexing and/or information based on radio frame indexing and ii) information based on D2D communication related subframe indexing and/or radio frame indexing.

This is for the purpose of clarifying which communication related subframe indexing (and/or radio frame indexing) is referred to for definition of the subframe index (and/or radio frame index) on which D2DSS (or PD2DSCH or sidelink synchronization signal) is transmitted when an offset is present between WAN communication related subframe indexing (and/or radio frame indexing) and D2D communication related subframe indexing (and/or radio frame indexing).

Here, information on the offset may be configured to be signaled by the eNB to D2D UEs through a predefined signal (e.g., physical layer signal or higher layer signal) or defined as previously fixed value(s).

In addition, D2D communication applies/receives interference to/from WAN communication (which refers to previous communication such as transmission of a PUCCH or PUSCH from a UE to an eNB) because D2D communication uses uplink resources through which UEs perform transmission.

In such circumstance, to protect at least one of WAN communication related control information/data (e.g., UCI) and D2D communication related control/feedback information transmitted through uplink resources, the eNB may set the a D2D UE (and/or a non-D2D UE) such that the D2D UE (and/or non-D2D UE) limits such information to part of uplink resources or shifts the information and transmits the information. In other words, small or no interference may be received through D2D communication in limited or shifted uplink resources.

Furthermore, to limit or shift the information to part of uplink resources, an eNB in a TDD system may be configured to signal additional UL-DL configuration information (i.e., DL HARQ reference configuration) in order to redefine a UL ACK/NACK (e.g. information about whether a PDSCH has been successfully received) transmission timeline for the D2D UE (and/or non-D2D UE).

Here, information about the DL HARQ reference configuration may be configured to be signaled by the eNB to the D2D UE (and/or non-D2D UE) through a predefined signal (e.g., physical layer signal or higher layer signal) or defined as a previously specified UL-DL configuration. Furthermore, UL-DL configurations that can be used as the downlink HARQ reference configuration may be defined as one or more UL-DL configurations having a relatively large number of DL subframes.

For example, the DL HARQ reference configuration can be designated or signaled as one of UL-DL configuration #2 (i.e., DSUDDDSUDD), UL-DL configuration #4 (i.e., DSUUDDDDDD) and UL-DL configuration #5 (i.e., DSUDDDDDDD). In this case, the subframe index on which the D2DSS (or PD2DSCH or sidelink synchronization signal) can be transmitted may be defined as a subframe index that is not a subframe index (e.g., UL subframe #2, #3 or #7) available for a UL subframe (i.e., UL subframe on which transmission of WAN communication related control/data information (and/or D2D communication related control/feedback information) is concentrated) and has higher possibility of being used for an uplink subframe in 7 UL-DL configurations defined in LTE (i.e., Table 2) in the DL HARQ reference configuration. In Table 2, the subframe index that satisfies these conditions is 4 or 8. Here, a situation in which there is no offset between WAN communication related subframe indexing (and/or radio frame indexing) and D2D communication related subframe indexing (and/or radio frame indexing) is assumed.

Furthermore, limiting or shifting to part of uplink resources according to the present invention has the advantages that the subframe index and/or radio frame index on which the D2DSS (or PD2DSCH or sidelink synchronization signal) is transmitted can be secured irrespective of UL-DL configurations of TDD, and interference between transmission and reception of WAN communication related control information/data and the D2DSS (or PD2DSCH or sidelink synchronization signal) or interference between transmission and reception of D2D communication related control/feedback information and the D2DSS (or PD2DSCH or sidelink synchronization signal) can be avoided.

Furthermore, if there is an offset K between WAN communication related subframe indexing (and/or radio frame indexing) and D2D communication related subframe indexing (and/or radio frame indexing), and the subframe index on which the D2DSS (or PD2DSCH or sidelink synchronization signal) can be transmitted is defined on the basis of WAN communication related subframe indexing (and/or radio frame indexing), the D2D UE interprets the subframe index on which the D2DSS (or PD2DSCH or sidelink synchronization signal) is transmitted as (4+K) or (8+K) from the viewpoint of D2D communication related subframe indexing (and/or radio frame indexing) even though the subframe index is set or signaled as 4 or 8.

Conversely, if there is an offset K between WAN communication related subframe indexing (and/or radio frame indexing) and D2D communication related subframe indexing (and/or radio frame indexing), and the subframe index on which the D2DSS (or PD2DSCH or sidelink synchronization signal) can be transmitted is defined on the basis of D2D communication related subframe indexing (and/or radio frame indexing), the D2D UE interprets the subframe index on which the D2DSS (or PD2DSCH or sidelink synchronization signal) is transmitted as 4 or 8 from the viewpoint of WAN communication related subframe indexing (and/or radio frame indexing) even though the subframe index is set or signaled as (4+K) or (8+K).

Alternatively, the subframe index may be defined as a subframe index that is not a subframe index available for an uplink subframe (e.g., UL subframe #2 or #7) and has higher possibility of being used for an uplink subframe in 7 UL-DL configurations defined in the standard (i.e., Table 2), in DL HARQ reference configurations other than UL-DL configuration #4 (UL-DL configuration #4 is excluded because only UL-DL configuration #4 from among UL-DL configurations #2, #4 and #5 uses subframe index #3 for an uplink subframe). The subframe index that satisfies these conditions in Table 2 is 3. Here, it is assumed that there is no offset between WAN communication related subframe indexing (and/or radio frame indexing) and D2D communication related subframe indexing (and/or radio frame indexing).

Alternatively, a plurality of subframe indices (and/or radio indices) that can be used for transmission of the D2DSS (or PD2DSCH or sidelink synchronization signal) may be defined or signaled, and i) a different D2DSS sequence or ii) a D2DSS sequence generated based on a different Zadoff-Chu root sequence index may be used depending on which one of the subframe indices (and/or radio frame indices) is used to transmit the D2DSS.

Here, i) a relationship between a subframe index (and/or a radio frame index) and a D2DSS sequence or ii) a relationship between a subframe index (and/or a radio frame index) and a Zadoff-Chu root sequence necessary to generate a D2DSS sequence may be signaled by the eNB to the D2D UE through a predefined signal (e.g., physical layer signal or higher layer signal) or previously defined.

In this case, a D2DSS reception UE recognizes a subframe index (and/or a radio frame index) through which a D2DSS transmission UE has transmitted the D2DSS through blind detection of a plurality of D2DSS sequences.

In addition, a specific subframe index (and/or a radio frame index) through which the D2DSS (or PD2DSCH or sidelink synchronization signal) can be transmitted may be signaled and a different D2DSS sequence or a D2DSS sequence generated based on a different Zadoff-Chu root sequence index may be used depending on the signaled specific subframe index (and/or radio frame index).

Furthermore, the D2DSS reception UE may be configured to recognize a subframe index (and/or a radio frame index) through which the D2DSS (or PD2DSCH or sidelink synchronization signal) is transmitted through a D2DSS repetition pattern and/or the D2DSS sequence. Additionally, the D2DSS transmission UE may be configured to determine a subframe index (and/or a radio frame index) through which the D2DSS is to be transmitted through a repetition pattern of the signaled D2DSS (and/or the D2DSS sequence).

Here, a relationship between the subframe index (and/or a radio frame index) and the repetition pattern of the signaled D2DSS may be signaled by the eNB to the D2D UE through a predefined signal (e.g., physical layer signal or a higher layer signal) or previously defined.

Furthermore, when the D2DSS (or PD2DSCH or sidelink synchronization signal) according to the present invention is only transmitted through a predefined subframe index (and/or radio frame index), the number of bits representing radio frame index information and/or subframe index information delivered through the PD2DSCH may be reduced.

For example, if the D2DSS is transmitted at predefined intervals of 40 ms and the transmission position thereof is decided as subframe index #3 of the first radio frame within a window of 40 ms, the PD2DSCH can indicate only the position of the 40 ms window in 1024 radio frame domains, to which the D2DSS belongs, with 8 bits (i.e., 10240 ms/40 ms=256, $\log_2(256)=8$ bits) (instead of 10 bits). In other words, the D2D UE that has received the 8 bits on the PD2DSCH recognizes time synchronization information (i.e., radio frame index information and/or subframe index information) assumed by a PD2DSCH transmission UE (and/or a D2DSS transmission UE).

Conversely, when the embodiment in which the D2DSS (or PD2DSCH or sidelink synchronization signal) according to the present invention is only transmitted through a predefined subframe index (and/or radio frame index) is not applied, the PD2DSCH requires 10 bits to indicate radio frame index information and 4 bits (i.e., Ceiling $(\log_2(10))=4$ bits) to indicate subframe index information, that is, a total of 14 bits.

The radio frame index information and/or the subframe index information to be delivered through the PD2DSCH may be defined as one of information based on WAN communication related subframe indexing (and/or radio frame indexing) and information based on D2D communication related subframe indexing (and/or radio frame indexing).

Furthermore, when the D2DSS is only transmitted through a predefined subframe index (and/or radio frame index) according to the present invention, information on the subframe index (and/or radio frame index) through which the D2DSS is transmitted may be used as an input parameter used to generate a sequence of a reference signal (e.g., DM-RS) used for decoding a predefined signal (e.g., PD2DSCH).

For example, the information on the subframe index (and/or radio frame index) through which the D2DSS is transmitted may be configured to be used as one of a plurality of parameters that determine a cyclic shift value of a DM-RS used for decoding the PD2DSCH (e.g., configured to perform a role similar to $n_{DMRS,\lambda}^{(2)}$ (or to derive $n_s$ (i.e., slot number within a radio frame) of $n_{PN}(n_s)$ from the subframe index information))

When different subframe indices through which the D2DSS is transmitted are defined for D2DSS related hop count values, the same D2DSS sequence or a D2DSS sequence generated based on the same Zadoff-Chu root sequence index is used (irrespective of different subframe indices through which different hop count values/D2DSSs are transmitted) and the PD2DSCH indicates most significant bits (MSBs) (e.g., 8 bits) of hop count values and a system frame number or MSBs of the hop count values and radio frame indices such that the D2D UE, which has received the MSBs, can recognize the final subframe index through which the D2DSS is transmitted through a combination of the corresponding information.

Here, a D2DSS related hop count value may increase by one whenever a D2DSS transmitted from a synchronization source (e.g., hop count 0) is relayed by another D2D UE. In addition, D2DSS transmission related subframe indices which are different for respective hop count values may be signaled by the eNB to the D2D UE through a predefined signal (e.g., physical layer signal or higher layer signal) or previously defined as fixed value(s).

Moreover, the aforementioned embodiments of the present invention may be included as one of methods of implementing the present invention and thus regarded as proposed methods. In addition, the aforementioned proposed methods may be independently implemented or some proposed methods may be combined (or aggregated). Furthermore, the aforementioned embodiments may be restrictively applied to a TDD system (e.g., a case in which a D2D UE within an eNB coverage (under a TDD system) transmits a D2DSS to a D2D UE outside the eNB coverage (under the TDD system)).

Figure 13:
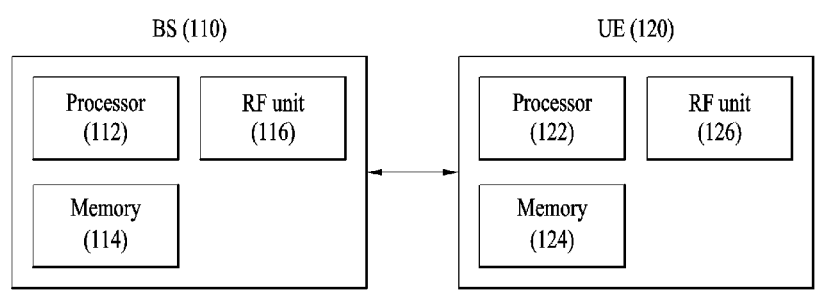
FIG. 13 illustrates a base station and a UE applicable to an embodiment of the present invention.

FIG. 13 illustrates a base station (BS) and a UE applicable to an embodiment of the present invention.

When a wireless communication system includes a relay, communication is performed between a BS and the relay on a backhaul link and communication is performed between the relay and a UE on an access link. Accordingly, the BS or UE shown in the figure may be replaced by the relay as necessary.

Referring to FIG. 13, a wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores various types of information related to operations of the processor 112. The RF unit 116 is connected to the processor 112 and transmits and/or receives radio signals. The UE 120 includes a processor 122, a memory 124 and a radio frequency (RF) unit 126. The processor 122 may be configured to implement the procedures and/or methods proposed by the present invention. The memory 124 is connected to the processor 122 and stores various types of information related to operations of the processor 122. The RF unit 126 is connected to the processor 122 and transmits and/or receives radio signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor.

The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While examples in which the method of transmitting a synchronization signal for D2D communication in a wireless communication system and the apparatus therefor are applied to 3GPP LTE have been described, the present invention is applicable to various wireless communication systems in addition to 3GPP LTE.

The invention claimed is:

1. A method for receiving a device-to-device (D2D) synchronization signal by a D2D terminal in a wireless communication system, the method comprising:
   receiving information related to radio resource configuration for D2D communication,
   wherein the information related to radio resource configuration comprises information for receiving the D2D synchronization signal;
   receiving the D2D synchronization signal based on the information related to radio resource configuration;
   deriving a subframe index through which the D2D synchronization signal is transmitted from a sequence repetition pattern of the D2D synchronization signal; and
   deriving a root sequence index of the D2D synchronization signal from the subframe index.

2. The method according to claim 1, wherein the subframe index is obtained by applying a predetermined offset to an index based on an uplink-downlink configuration for Wide Area Network (WAN) based communication.

3. The method according to claim 1, wherein the subframe index is predefined, and
   wherein the D2D synchronization signal indicates a position of a window having a predetermined period in which the D2D synchronization signal is received, in a radio resource corresponding to the subframe index.

4. The method according to claim 1, wherein the D2D synchronization signal includes information indicating the number of relays for D2D communication.

5. The method according to claim 4,
   wherein the D2D synchronization signal includes information of a hop count and a system frame number.

6. The method according to claim 1, wherein the D2D synchronization signal is a sidelink synchronization signal.

7. A device-to-device (D2D) terminal for receiving a D2D synchronization signal in a wireless communication system, the D2D terminal comprising:
   a radio frequency (RF) unit; and
   a processor,
   wherein the processor is configured to:
   control the RF unit to receive information related to radio resource configuration for D2D communication,
   wherein the information related to radio resource configuration comprises information for receiving the D2D synchronization signal;
   control the RF unit to receive the D2D synchronization signal based on the information related to radio resource configuration;
   derive a subframe index through which the D2D synchronization signal is transmitted from a sequence repetition pattern of the D2D synchronization signal; and
   derive a root sequence index of the D2D synchronization signal from the subframe index.

8. The D2D terminal according to claim 7, wherein the subframe index is obtained by applying a predetermined offset to an index based on an uplink-downlink configuration for Wide Area Network (WAN) based communication.

* * * * *